United States Patent [19]

Maussion

[11] 4,246,473
[45] Jan. 20, 1981

[54] CHARACTER READING SYSTEM

[75] Inventor: Daniel Maussion, Angers, France

[73] Assignee: Compagnie Internationale pour l'Informatique, Paris, France

[21] Appl. No.: 79,363

[22] Filed: Sep. 27, 1979

[30] Foreign Application Priority Data

Oct. 19, 1978 [FR] France .................................. 78 29848

[51] Int. Cl.$^3$ .......................... G06K 7/08; G06K 7/14
[52] U.S. Cl. ..................................... 235/449; 235/463
[58] Field of Search ...................... 235/449, 45 D, 462, 235/463, 494, 493; 340/146.3 Z; 360/40, 113

[56] References Cited

U.S. PATENT DOCUMENTS

| | | | |
|---|---|---|---|
| Re. 26,744 | 12/1969 | Perotto .................................. | 235/494 |
| 3,309,667 | 3/1967 | Feissel et al. ........................ | 235/494 |
| 3,700,858 | 10/1972 | Murthy ................................ | 235/463 |
| 3,832,529 | 8/1974 | Nakamura ............................ | 235/463 |
| 4,182,481 | 1/1980 | Maussion ............................. | 235/449 |

*Primary Examiner*—Daryl W. Cook
*Attorney, Agent, or Firm*—Kerkam, Stowell, Kondracki & Clarke

[57] ABSTRACT

A system for reading coded characters, in particular characters coded in the CMC7 code, includes at least one reading head, two threshold switching circuits which receive output signal from the reading head, two recognition channels which receive signals from the two threshold switching circuits, a multiplexer MX which enables either one or other of groups of outputs from the two recognition channles to be selected, and error detecting circuits which control the position of the multiplexer MX to enable certain reading errors to be corrected automatically.

11 Claims, 13 Drawing Figures

CHARACTER READING SYSTEM

BACKGROUND OF THE INVENTION

1. Field of the Invention

The invention relates to a system for reading coded characters which are formed on a document by a succession of groups of segments which are separated from one another by intervals of lengths selected from a predetermined set of several lengths.

The object of the invention is to provide a system capable of automatically correcting certain reading errors resulting in particular from defects in the document, which make it difficult to read by electronic means. The invention is applicable in particular but not solely to the reading of characters printed in the code referred to by the abbreviation CMC7 (coded magnetic characters composed of 7 elements) which is widely used in Europe by banks, financial institutions and commercial concerns in order to record on their checks the priniciple items of information, such as the code number of the issuing branch, that of the account of the drawer, etc.

2. Description of the Prior Art

On certain documents, special characters are formed (in particular are printed in a special ink such as a magnetizable ink) so that they can be read automatically by electronic means. Thus, current use is made of characters formed by a succession of groups of segments which are separated from one another by intervals of lengths selected from a set of n predetermined lengths. In addition, each character defined by a constant number in intervals selected from the n length is separated from its neighbor by an interval longer than the longest of the n intervals.

As mentioned above, the most widely used of these codes is the CMC7 code. This code is capable of representing alphanumeric characters which have the advantage of being readable both by machine (by the detection of a magnetic field) and by an individual, since each alphanumeric character is able to appear on the document in a slightly "chopped up" but nevertheless perfectly intelligible form. The larger the number n, the greater the number of different characters which can be coded. Thus, in the case of the CMC7 code, i.e. specifically a numerical code restricted to 15 characters (10 numerals and 5 special symbols) employed in processing checks, there are 7 segments which define 6 intervals among there must be two long intervals and 4 short intervals. The various possible combinations of the orders in which the long and short intervals follow one another enable the characters to be differentiated. Thus, in the CMC7 code, the numeral 0 is defined by reading from left to right, two short intervals, two long intervals and two short intervals; the numeral 1 is defined by one long interval, three short intervals, one long interval and one short interval; the numeral 2 is defined by one short interval, two long intervals and three short intervals; etc. The standard sizes of the intervals are defined as follows:

center-to-center distance between two segments separated by a short distance (short interval)
a = 300M
center-to-center distance between two segments separated by a long distance (long interval)
b = 500M
width of a segment
l = 150M
size of the very long interval (between two successive characters)
c ≧ 930F In the majority of cazses, the segments, separated by the abov e-mentioned intervals, are printed in a magnetizable ink.

Various methods and apparatus for reading these coded characters are known. My prior U.S. application Ser. No. 936,693, now U.S. Pat. No. 4,182,481, discloses a bar code reading device suitable for use in the present invention and the subject matter thereof is hereby incorporated by reference.

One known reading method consists in passing a document in front of a single reading head and measuring the intervals of time between the passages of two successive segments in front of the gap of the reading head. The system suffers from the major disadvantage that it requires the speed of movement to be perfectly steady.

A second method of reading, which is described in particular in French Pat. Specification No. 2,289,010 entitled "Arrangement For Reading An Item of Information", enables the short and long intervals to be distinguished by using two reading heads (or a double reading head with two sensors) which are spaced apart by a distance equal to one of the intervals. Thus, to distinguish a long interval from a short interval, one detects whether or not the segments pass in front of the two heads simultaneously. Also, to enable the speed of movement to be reduced without incurring any disadvantages, the arrangement employs sensors which are produced from magnetoresistors which are sensitive to the strength of the received magnetic field rather than to its variation. Magnetoresistive readers are described in U.S. Pat. Application Ser. Nos. 899,383 and 899,217 which were filed on behalf the assignee of the present invention. However, in the case of the CMC7 code, it is not possible to recognise the very long interval with two magnetoresistors.

A third method of reading is described in particular in a U.S. Pat. application Ser. No. 968,789 which was also filed on behalf of the assignee of the presenst invention. It consists in using (in the case of the CMC7 code) two magnetoresistors separated by a distance e (center-to-center spacing) which meets the dual condition of inequality:

$$b-1<e=a+1$$

The principle advantage of this third method of reading over the second method is that it enables the very long interval to be distinguished using only two magnetoresistive sensors separated by the distance e. Still in the context of the CMC7 code, if the sensor which is so disposed as to be the first to detect the presence of a magnetic segment during the relative reading motion between the document and the said sensors is called "first sensor" and the sensor which is so situated as to be the second to read the same item of information is called "the second sensor", the rule governing the recognition of the different intervals is as follows:

(1) a long interval is detected when a rising edge of a pulse generated by the first sensor is registered while a pulse generated by the second sensor is present, (2) a short interval is detected when a falling edge of a pulse generated by the first sensor is registered while a pulse generated by the second sensor is present, (3) a very long interval is detected when no pulse is generated by the first sensor during the time a pulse generated by the second sensor is present.

The above mentioned Patent Application Ser. No. 968,789 also shows how the principle may be applied in general to distinguishing between a larger number of intervals using a larger number of magnetoresistive sensors.

However, inter alia, for all the three methods of reading referred to above, reading errors are possible. These are mainly due either to imperfections in the printing of the characters (inking faults or the presence of tiny blemishes which may be interpreted as additional segments by the reading system) or to damage to the carrier which has caused such faults to occur in the printing of the characters. It should not be forgotten that a check is often crumpled or at least folded when it is presented for payment.

SUMMARY OF THE INVENTION

The present invention has as a primary object to provide a high performance reading system which is capable both of detecting the majority of reading errors, and of automatically correcting certain of them or at least indicating the presence of a reading error which cannot be corrected automatically. The general principle of the invention is applicable not only to the three methods of reading briefly described above, which may use magnetoresistive or other reading heads, but is also readily adaptable to other, non-magnetic means of coding, that is to say means involving other physical phenomena (electrical, opto-electrical, etc.).

Briefly, the basic feature of the invention resides in the fact that a plurality of separate recognition channels are provided which receive the signals from the sensor or sensors of the reading head via analog/digital converter means comprising a plurality of switching threshold circuits having different respective thresholds, and that error detecting means are provided associated with each recognition channel which accept only the signals emitted by the first recognition system whose corresponding error detecting means detects no reading errors, starting with the recognition channel associated with the lowest threshold (and thus the most sensitive) and progressing to the recognition channel associated with the highest threshold (the least sensitive), the said recognition channels being classified in the ascending order of the said thresholds.

To be more exact, the invention relates to a system for reading coded characters formed on a document by a succession of groups of segments of constant width, which are aligned along a reading path and which are separated from one another, in order to define a given character, by intervals whose lengths are selected from a set of n predetermined lengths. The characters can be recognized electronically by the detection of a physical, and in particular, magnetic phenomenon by an associated sensor. The sensor comprises at least one reading head incorporating at least one sensor arranged facing the reading path. A drive means provides relative movement between the reading head and the document. The reading head has at least one output for analog signals representing the intervals read by the sensor. The system further comprises an analog signal output for signal pulses for each predetermined length, and analog/digital converter circuit connected to the analog signal output. A logic circuit which is connected between the converter circuit and the pulse signal outputs recognizes the intervals. The invention is characterized in particular by the provision of a converter circuit comprising m threshold switching circuits having different respective threshold values, and in that the said circuit for recognizing the said intervals comprises essentially:

m separate recognition channels (m being a whole number greater than 1) each connected to the output of one of the aforementioned threshold switching circuits and each having a group of n outputs corresponding to the n intervals of length, an m position selector circuit having n outputs connected to respective ones of the pulse signal outputs for each said predetermined length and m groups of n inputs each connected to a respective one of the groups of n outputs of the m recognition channels. Control means are provided for enabling the n inputs of one of the m groups to be brought selectively into correspondence with the n outputs of the said selector circuit in a predetermined order commencing from the group connected to the recognition channel associated with the lowest threshold and progressing to the group connected to the recognition channel associated with the highest threshold in the ascending order of the said thresholds.

Identification error detecting means are operatively coupled to the control means to actuate the latter to produce and continue with the predetermined order of succession as long as an error is detected in the signals transmitted by a recognition channel whose outputs are currently coupled to the outputs of the selector circuit.

It will be understood that in the case of the CMC7 code, n=2 since, from the above definition, the very long interval defined above plays no part in defining a given character, but simply acts to indicate the reading of the following character. Also, in all the embodiments which will be described in detail below, m is selected equal to 2, which in practice means that each analog/digital converter circuit comprises one low threshold switching circuit and one high threshold switching circuit. One of the embodiments however relates specifically to the third method of reading described above, that is to say where a double reading head is used which in fact contains two magnetoresistive sensors. In this case, the reading head will thus have two separate analog signal output means which each transmit the signal from one sensor and each analog signal output will be connected to threshold switching circuits (m=2). There will thus be a total of four threshold switching circuits of which two will be set to the low threshold and two to the high threshold.

BRIEF DESCRIPTION OF THE DRAWINGS

The invention will be better understood and further of its objects, details and advantages will become clear in the light of the following explanatory description of several embodiments of this system according to the invention, given solely by way of example and with reference to the accompanying non-limiting drawings, in which.

DESCRIPTION OF THE PREFERRED EMBODIMENTS

Figure 1:
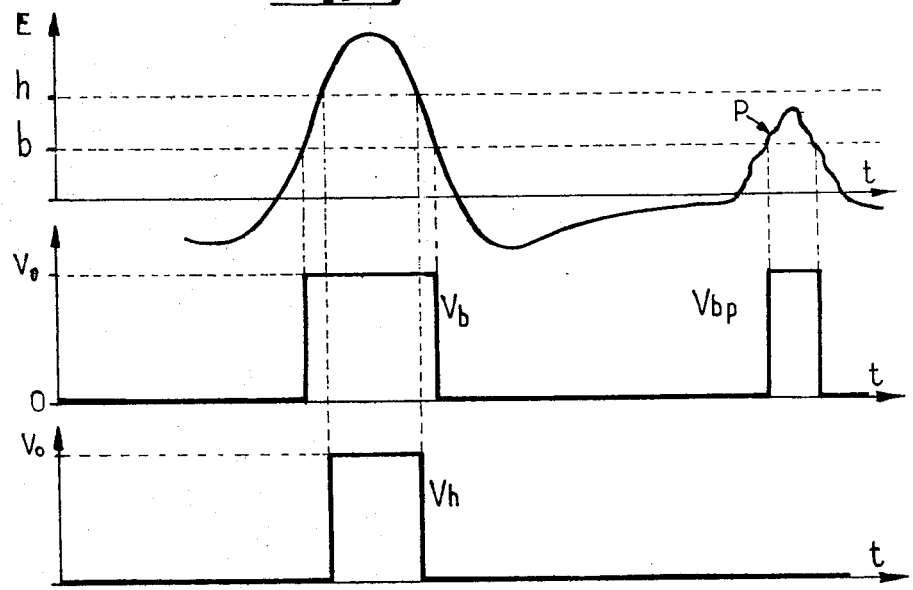
FIG. 1 is a diagram with reference to time showing the characteristics of the signals generated by switching circuits set to different thresholds, from the same analog signal.
Figure 2:
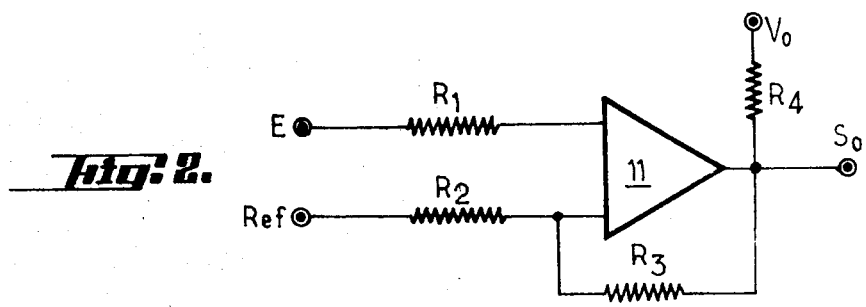
FIG. 2 shows an embodiment of threshold switching circuit which can be used in the present invention.

Referring to FIG. 1, the uppermost signal is an analog signal wave form which represents the response of a magnetoresistive sensor (not shown) when a magnetized segment on the document passes close to the said sensor. FIG. 2 shows a conventional threshold switching circuit which may receive the analog signal and convert it into one of the two steep-fronted pulses Vb or Vh, as shown in FIG. 1. The switching circuit comprises a differential amplifier 11 of very high loop gain which is connected in a perfectly conventional fashion to resistors $R_1$, $R_2$, $R_3$ and $R_4$. The analog signal is applied to the input E at the free terminal of resistor $R_1$ and a reference voltage (whose value is h or b depending upon whether the switching circuit is set to the high or low threshold) is applied at all times to input Ref. at the free terminal of resistor $R_2$. The pulse Vb or Vh becomes available at output $S_0$. Given its high gain, the differential amplifier 11 is always either in its blocked state or its saturated state, depending upon whether the value of the analog signal is higher or lower than the value of the selected threshold h or b applied to input Ref. It will be seen that given the form of the analog signal (or to be more exact of its positive—going central part which is made use of), the lower the threshold selected the longer is the resulting steep edged pulse. In other words, a recognition channel associated with the low threshold is necessarily the most sensitive one.

The corresponding switching circuit supplies "long" pulses which are more easily processed by the digital logic circuits which form the character recognition channel connected to said switching circuit. Thus, as far as possible, when the reading conditions are good, it is beneficial to take the identification results from the recognition channel associated with the lowest threshold. However, it is in this recognition channel that there is the greatest likelihood of spurious pulses occurring. These pulses may particularly be caused by small spots of magnetizable ink, when the characters are printed on the document by this means. A spurious analog signal P, generally of small amplitude, is shown in FIG. 1 and it can be seen that it produces a spurious pulse Vbp in the low threshold switching circuit, whereas no spurious pulse is generated by the high threshold switching circuit. In this case, it is beneficial to select the pulse signals transmitted to the recognition channel associated with the high threshold. In accordance with the invention, this selection is done automatically.

Figure 3:
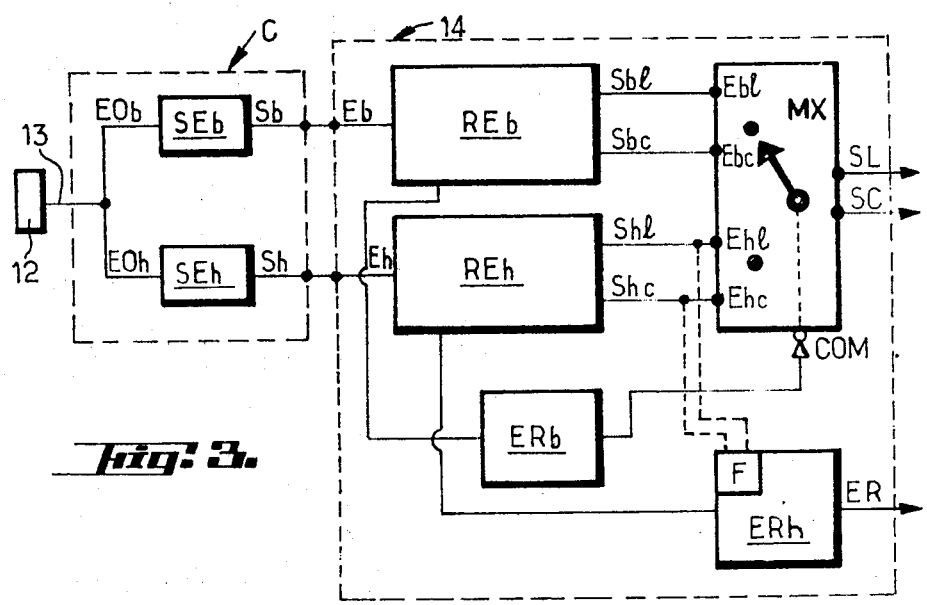
FIG. 3 is a block diagram of a reading system according to the invention having a single reading head employing a single sensor which operates by detecting an arbitrary physical phenomenon, where n=2 (as in the case of the CMC7 code) and m=2.

FIG. 3 shows the system in its most general form. A reading head 12 has an analog signal output 13 which is connected to inputs EOb and EOh of the two threshold switching circuits SEb and SEh, respectively, of an analog/digital converter circuit C. Circuit SEb is set to have a low threshold and circuit SEh is set to have a high threshold in conformity with the foregoing description. The respective outputs of circuits SEb and SEh will be called Sb and Sh. Apart from circuit C, it is essential for the system in FIG. 3 to have a pulse signal output for each predetermined length used to code characters. In the example being described, since n=2, there are thus at least two outputs SL and SC at which pulses are to appear when long and short intervals, respectively, have been identified by a circuit 14 for recognizing these intervals. Internal identifying circuit 14 is connected between circuit C and the two outputs SL and SC. The internal layout of the recognition circuit 14 naturally depends on the principle adopted for reading which, inter alia, may be one of the three methods of reading which were described briefly above. However, it necessarily includes two separate recognition channels (m=2) REb and REh having respective inputs Eb and Eh connected to the outputs Sb and Sh of threshold switching circuits SEb, SEh respectively, as well as two error detecting circuits ERb and ERh and a selecting circuit MX (formed by an m channel multiplexer). The two error detecting circuits ERb and ERh are respectively connected to recognition channels REb and REh and are capable of detecting certain reading errors transmitted through the recognition channels. Each recognition channel has a group of two outputs (n=2). These outputs are Sbl, Sbc in the case of recognition channel REb and Shl, Shc in the case of recognition channel REh. These outputs correspond to the two possible intervals (long and short) in the code and it will be appreciated that the recognition channels are arranged to transmit pulses sequentially to the corresponding outputs, depending upon whether a long or short interval has been identified. The multiplexer MX also has two positions (m=2) and the outputs SL and SC of the system are in fact also the outputs of the multiplexer. Multiplexer MX comprises two groups of two inputs (m=n=2) which are each connected to respective ones of the groups of two outputs of the two recognition channels REb and REh. Thus, outputs Sbl and Sbc are connected to a first group of the inputs EBl and Ebc, while outputs Shl and Shc are connected to a second group of two inputs Ehl and Ehc. The multiplexer MX is arranged to bring either the inputs Ebl, Ebc which are connected to recognition channel REb (associated with the lowest threshold) or inputs Ehl, Ehc which are connected to the recognition channel REh (associated with the higher threshold) into correspondence selectively with the outputs Sl, Sc. The changeover is brought about by control means which react to a control signal generated by the circuit ERb connected to the COM output of multiplexer MX. Thus, when no error in identification is picked up during the operation of recognition channel REb, the multiplexer is held in a first position in which inputs Ebl, Ebc correspond to outputs SL, SC respectively. Conversely, if circuit ERb indicates an error, a control pulse is applied to COM input which actuates the control means of the multiplexer. The latter then causes inputs Ehl, Ehc to correspond with outputs SL, SC respectively. If circuit ERh does not detect an error in identification in recognition channel REh (which is the case illustrated in FIG. 1) the reading is considered satisfactory and events continue as if the system had itself automatically corrected its reading error. Conversely, if the error is still present, circuit ERh can be connected to output ER so as to transmit a signal which is capable of being accepted by a character processing and identifying unit (not shown) which is connected downstream of the system shown in FIG. 3, that is to say which is connected to receive at least the signals appearing at outputs SL, SC and ER.

It should be noted that the system shown in FIG. 3 is merely a system for reading characters and not for completely identifying them. The processing and identifying unit mentioned above is designed to determine which character has been read using as a basis the order in which the pulse appears at output SL and SC. Thus, it will be recalled that for the case of the numeral 0 there will successively appear two pulses at output SC then two pulses at output SL and finally two pulses at output SC. Other means, not shown in FIG. 3, enable the said processing and identifying unit to recognize the beginning and end of the reading of a character (a very long interval in the case of the CMC7 code). If a signal is transmitted from output ER while a character is being read, the processing and identifying unit will then "know" that it has not been possible to correct an anomaly during the reading of a character in question, since the error signal has been generated by the error detecting circuit connected to the recognition channel REh associated with the higher threshold. The processing and identifying unit can thus be programmed to emit a signal for the non-recognition of a character read, which reports the anomaly to an operator. It may also be mentioned that output ER may readily be dispensed with, if it is desirable to restrict the number of connections between the reading system described and the above mentioned processing and identifying unit. For this purpose, it is merely necessary to provide a driving means F which is associated with circuit ERh and connected to multiplexer MX. This modification is indicated by the broken-line connections in FIG. 3. In effect, the processing and identifying unit is programmed to interpret the order of succession of the pulses which appear at outputs SL and SC. Thus, it is therefore a simple task to add to this unit so as to enable it to interpret the simultaneous appearance of two pulses at outputs SL and SC as an error since an interval read cannot be both long and short simultaneously. Thus, in the case of the CMC7 code, the "intelligent" behavior of the processing and identifying unit may be summarized by the following truth table:

| SC | SL | INTERPRETATION |
|----|----|----------------|
| 1  | 0  | Short interval |
| 0  | 1  | Long interval  |
| 0  | 0  | Very long interval |

-continued

| SC | SL | INTERPRETATION |
|----|----|----------------|
| 1  | 1  | Error          |

Under these conditions, if the driving means F are actuated by circuit ERh to apply two pulses simultaneously to outputs L and SC in the event of a reading error which cannot be corrected automatically, output ER may advantageously be dispensed with.

The more general application to a reading system having more than two threshold values (m>2) can easily be deduced from the foregoing. It merely is necessary to provide m recognition channels, a multiplexer having m groups of n inputs and m positions; the position of the said multiplexer being determined by the said means for controlling it which are actuated by (m−1) circuits for detecting errors in (m−1) recognition channels associated with the (m−1) lowest thresholds; so as to bring the m groups of inputs successively into correspondence with the outputs of the multiplexer in the ascending order of the corresponding thresholds until the circuit for detecting errors in one of the identifying channels associated with a given threshold possibly fails to record a reading error. The signals transmitted by this channel then are validated and accepted by the processing and identifying unit. In addition, the circuit for detecting errors in the recognition chain associated with the highest threshold would, for example, be coupled to driving means F of the kind described above.

Figure 4:
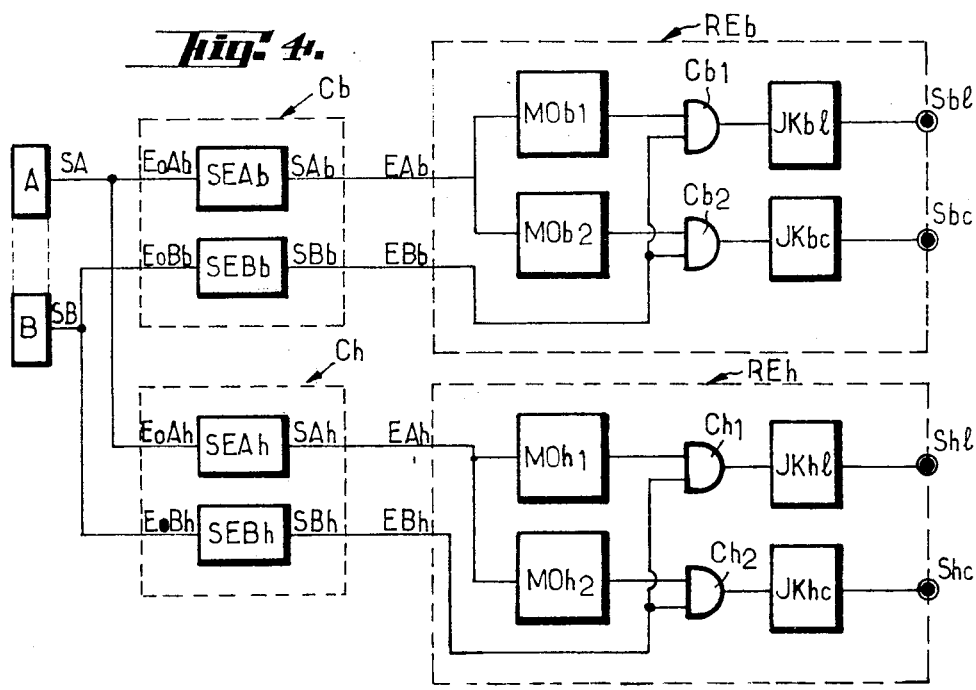
FIG. 4 shows a modification of part of the circuit of FIG. 3 in the case of a double reading head comprising for example, two magnetoresistive sensors which are spaced apart by a distance e which meets the dual condition of inequality set out above.

FIG. 4 is an illustration of a reading system employing a double reading head having two magnetoresistive sensors spaced apart by a distance e which satisfies the relationship:

$$b-1<e<a+1$$

In other words, the reading system shown in FIG. 3 operates by using the third method of reading described above. In the remainder of the text, the sensor which is arranged to be the first to detect the presence of a magnetized segment when the relative movement occurs between the reading head and the document will be called either the first sensor or sensor A, while the other sensor which reads the same information as sensor A but with a displacement in time due to the spacing e (400M in the case of CMC7 code) between the two sensors will be called either the second sensor or sensor B. Following the same principle, circuit elements which receive signals from the first sensor will include the letter A in their references, while circuit elements which receive signals from the second sensor will include the letter B in their references (the same way as the letter h or b was used to correlate a circuit of a high or low threshold).

Under these conditions, as indicated above, the system of FIG. 4 contains two analog/digital converter circuits Cb and Ch each having two threshold switching circuits. Circuits SEAb, SEBb are connected to inputs EAb, EBb of the recognition channel REb associated with the low threshold and circuits SEAh, SEBh are connected to inputs EAh, EBh of the recognition channel REh associated with the high threshold. The analog signal output SA of sensor A is connected to inputs EOAb and EOAh of circuits SEAb and SEAh, while the analog signal output SB of sensor B is connected to inputs EOBb and EOBh of circuits SEBb and SEBh. Recognition channel REb has two inputs EAb and EBb which are connected to outputs SAb and SBb respectively of circuits SEAb and SEBb. Similarly, recognition channel REh has two inputs EAh and EBh which are connected to outputs SAh and SBh respectively of circuits SEAh and SEBh. A specific description will now be given of recognition channel REb; channel REh has the same structure.

Figure 5:
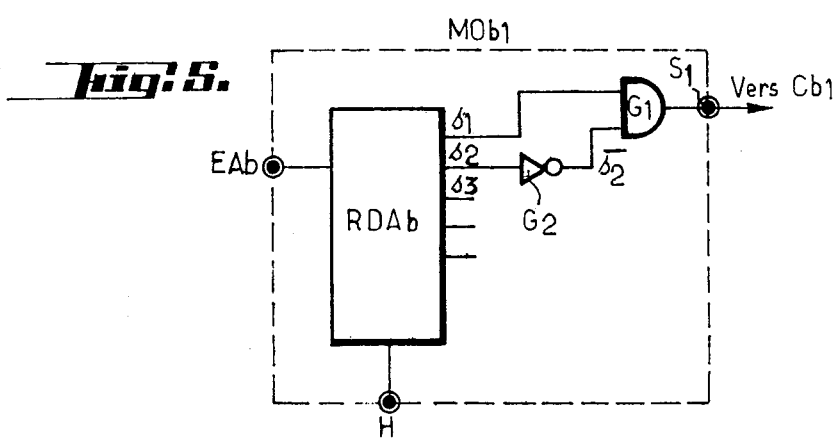
FIG. 5 shows an advantageous embodiment of a means forming a monostable circuit sensitive to the rising edge of the input signal.

Recognition channel REb first of all contains a monostable means Mob1 sensitive to a rising edge, that is to say a means which is arranged to be activated and produce an output pulse in response to each rising edge of its input signal, and a monostable means MOb2 sensitive to a falling edge, that is to say a means which is adapted to be actuated to produce an output pulse in response to each falling edge of its input signal. These monostable means may be formed from shift registers, as shown in FIG. 5. The monostable means are connected to receive the signals applied to input EAb. This being the case, monostable MOb1 will supply an output signal signifying each rising edge of each pulse generated by circuit SEAb, while monostable MOb1 will supply an output signal signifying each falling edge of each pulse generated by circuit SEAb. The output of monostable MOb1 is connected to an input of a first two input logic circuit Cb1 of which the other input is connected to input EBb to receive the signal generator circuit by SEBb. Similarly, the output of monostable MOb2 is connected to one input of a second two input logic circuit Cb2 of which the other input in connected to input EBb. Logic gates Cb1 and Cb2 may be any logic gate or gating circuit which is adapted to produce the logic product, in contrast to the logic sum of the input signals. It is for this reason that, in FIG. 4, each logic circuit is represented by an AND gate, although a NAND gate could also be used. In other words, bearing in mind what is said above, it can be seen that logic circuit Cb1 is adapted to emit a significant output signal when a signal from the first monostable means MOb1 arrives during the period of a pulse generated by the threshold switching circuit SEBb associated with sensor B. Similarly, logic circuit Cb2 is adapted to emit a significant output signal when a signal from the second monostable means MOb2 arrives during the period of a pulse generated by threshold switching circuit SEBb. The outputs of the logic circuits Cb1 and Cb2 are respectively connected to the inputs of first and second circuit means JKb1 and JKbc forming memories. In practise these circuits may be simple JK flip-flops so that the significant output signals from circuits Cb1 and Cb2 are at once memorized and appear at the outputs Sbl and Sbc which are connected to the outputs of memories JKbl and JKbc, respectively.

A specific description will now be given of one monostable means, with reference to FIG. 5. For the purposes of the example, it will be assumed that the monostable involved is monostable MOb1. The input is thus EAb and the output S1 is connected to logic circuit Cb1. Use is made of a shift register RDAb whose signal input is connected to input EAb so to receive the pulses generated by the low threshold switching circuit SEAb connected to the first sensor A. An input H of the shift register receives a clock signal of relatively high frequency. The register also has a number of outputs s1, s2, s3, s4. As is a natural result of the operation of the shift register, a pulse applied to input EAb will be transmitted through output s1 with a delay 1H (a delay of 1 clock pulse) to output s2 with a delay 2H, to output s3 with a delay 3H and so on. This is illustrated in FIG. 5a.

In the circuit shown in FIG. 5, output s1 is connected to one input of a two-input AND gate, or a two input NAND gate and output s2 is connected to the second input of the same gate via a NOT gate G2. The signal which becomes available at output s1 obeys the logic condition:

$$S1 = s1 \cdot \overline{s2}$$

Figure 5A:
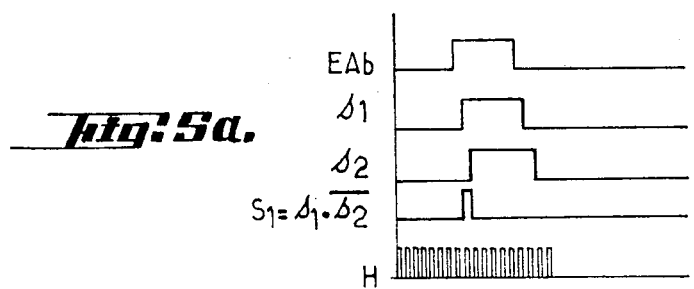
FIG. 5a is a diagram with a respect for time illustrating the operation of the circuit of FIG. 5.

It can be seen from FIG. 5a that the signal is a pulse of length 1H which substantially coincides in time with the rising edge of the signal applied to input EAb. Thus, there is provided a genuine monostable means sensitive to a rising edge function, since what is obtained at the output is a pulse of a predetermined length 1H (monostable) which coincides to the rising edge of the input signal.

Figure 6:
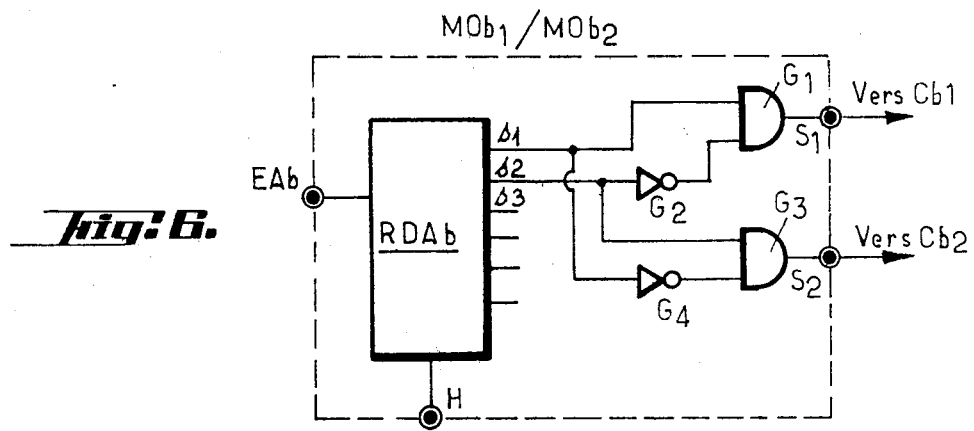
FIG. 6 is a diagram showing a combination of a means forming a monostable circuit sensitive to the rising edge and a means forming a monostable circuit sensitive to the falling edge of the input signal.

To obtain the function of a monstable means sensitive to a falling edge, it is merely necessary to apply the logic condition:

$$S2 = \overline{s1} \cdot s2$$

which merely requires an AND gate (or a NAND gate) and a NOT gate. It can thus be seen that it is not necessary to use two shift registers to produce circuits MOb1 and MOb2. The circuits can easily be combined in the way shown in FIG. 6. The additional AND gate is G3 and its output is s2. The additional NOT gate is G4; its input is connected to output s1 and its output to one input of the gate G3. The other input of gate G3 is directly connected to the output s2 of shift register RDAb.

Figure 7:
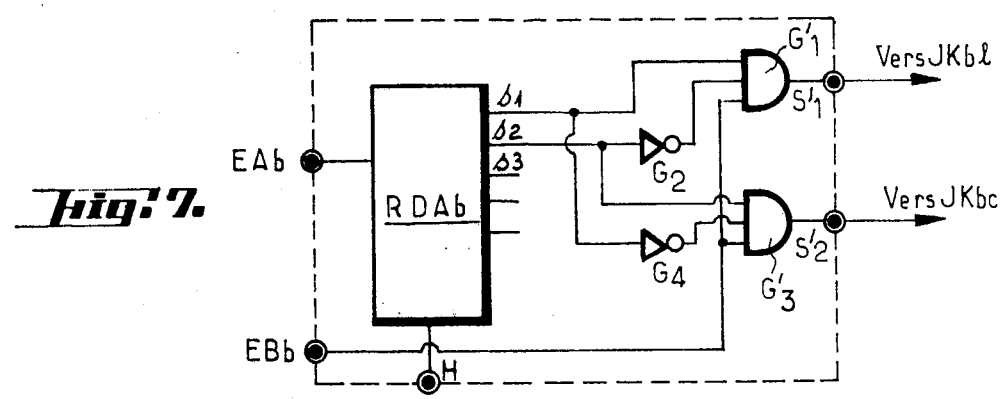
FIG. 7 is a diagram showing a combination of the circuit of FIG. 6 in combination with circuits of FIG. 4 and in particular the application of signal EBb.

From the point of view of practical construction, it is possible to save components by combining monostables MOb1 and MOb2 with the logic circuits cb1 and Cb2. This simplified construction is illustrated in FIG. 7. As compared with the circuit in FIG. 6, gates G'1 and G'3 now each have a third input connected to the low threshold switching circuit which receives the signals from sensor B, that is to say to input EBb of recognition channel REb. Conversely, outputs S'1 and S'2 of these AND gates (or NAND gates) are now connected directly to flip-flops JKb1 and JKbc respectively.

Figure 8:
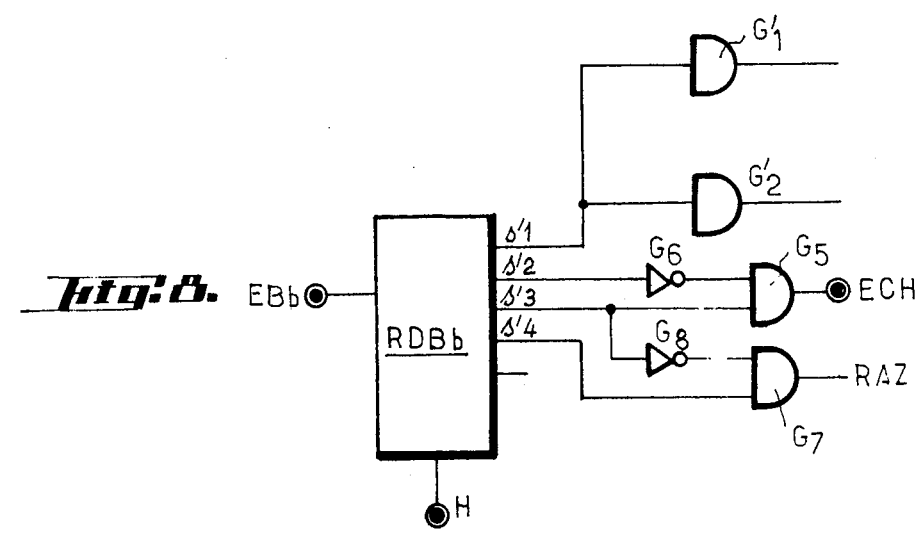
FIG. 8 is a diagram showing the circuits for generating sampling (or validating) signals and zero reset signals for the system according to the invention.

FIG. 8 shows an additional shift register RDBb which may be interconnected between input EBb and the third inputs of gates G'1 and G'3 to delay the signal from sensor B by a time 1H. In this case, the said third inputs of gates G'1 and G'3 are connected to output s'1 of the shift register. It is also helpful for use to be made of this shift register to generate the synchronizing and reset signals for the entire system. Thus, if it is decided that the detection of a long or short interval, identifiable by the states of the memory-forming means JKb1 and JKbc which are retransmitted into the outputs of multiplexer MX, will only be accepted at the end of a signal generator by circuit SEBb, it is easy to produce such a validating or sampling signal by applying the condition:

$$ECH = \overline{s'2} \cdot s'3$$

Which is achieved by the circuit of FIG. 8 by means of an AND gate G5 of which one input is connected to output s'3 of shift register RDBb and the other input to the output s'2 of the same register via a NOT gate G6. Output ECH, that is to say the output of gate G5 may form one output of the reading system according to the invention, in the same way as outputs SL and SC, if the processing and indentifying unit mentioned above is designed to receive the corresponding signals in such a way that it does not take into account the signals transmitted to outputs SL and/or SC only at the moment when a pulse is transmitted to output ECH. It is also possible to use shift register RDBb, to generate general zero reset pulses after the identification of each interval by applying for example the logic condition:

$$RAZ = \overline{s'3} \cdot s'4$$

With this condition, a reset pulse will thus occur consistently at an interval of 1H after a validating or sampling pulse ECH. In fact, the zero reset signal is obtained by means of an AND gate G7 (or a NAND gate) of which one input is connected to output s'3 via a NOT gate G8 and of which the other input is directly connected to output s'4 of the shift register RDBb. Of course, each flip-flop JKb1, JKbc, JKh1, JKhc has a zero reset input (not shown) which is connected to output RAZ in FIG. 8.

Everything which has been said with reference to recognition channel REb, which is associated with the low threshold, also applies to recognition channel REh, which is associated with the high threshold. Accordingly, the latter recognition channel will not be described in detail.

A description will now be given of the two error detecting circuits ERb and ERh, the latter being associated with driving means F.

In view of the principal of recognition of the long and short intervals, as set forth above, there are a number of situations which can definitely be recognized as anomalies, namely:

(1) if more than one transition or change of state in the signal applied by circuit SEAb, (or SEAh) is recorded during the period of a pulse applied by circuit SEBb (or SEBh). Two of the most frequently encountered situations are illustrated by the diagram with reference to time of FIG. 9.

(2) if a pulse is emitted by circuit SEAb (or SEAh) and there is no transition or change of state during the whole period of a pulse emitted by circuit SEBb (or SEBh). This case is illustrated by the diagram with reference to time of FIG. 10.

Figure 9:
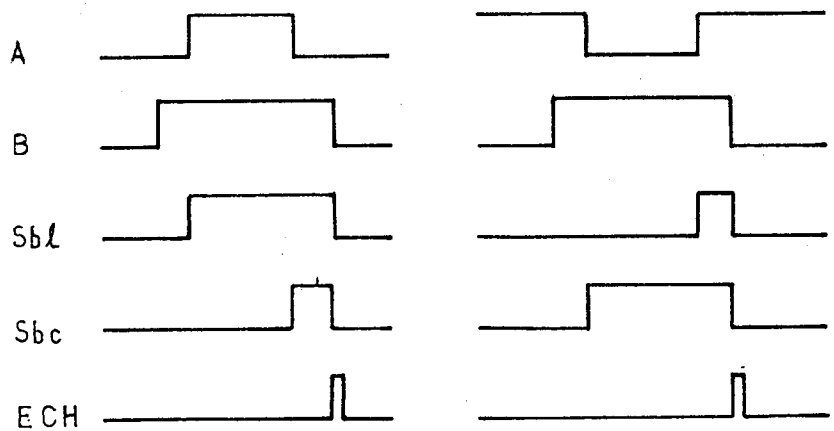
FIGS. 9 and 10 are diagrams with respect to time showing the various kinds of anomaly which can be detected by the system.

It can be seen from FIG. 9 that the first type of error is equivalent to the logic condition: Sbl·Sbc being detected in the recognition channel REb associated with the lower threshold or the logic condition Shl·Shc being detected in the recognition channel REh associated with the high threshold. This being the case, a gate of the AND type or the NAND type may be provided at least in circuit ERb, whose two inputs are connected to respective ones of the outputs Sbl and Sbc of the recognition channel.

Furthermore, the second eventuality is equivalent to the logic condition $\overline{Sbl} \cdot Sab$ in the case of recognition channel REb or to the condition $\overline{Sbh} \cdot SAh$ in the case of recognition channel REh.

Figure 10:
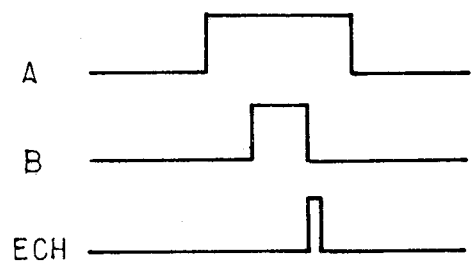

In effect, if the second kind of error illustrated by FIG. 10 occurs, flip-flop JKbl does not change state ($\overline{JKbl}=1; Sbl=Sbc=0$) for the whole duration of the signal present at output SAb and in particular at the time when the validating pulse ECH is generated at the end of the pulse transmitted to output SBb.

Figure 11:
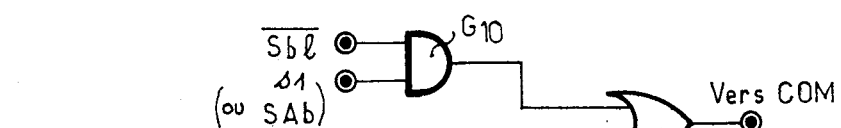
FIG. 11 shows an embodiment of the circuit ERB of FIG. 3.

To sum up what has been said above, the error detecting circuit ERb could, for example, conform to the layout shown in FIG. 11. An AND gate (or a NAND gate) G10 has one of its inputs connected to an output Sbl complementary to output $\overline{Sbl}$ and its other input connected to output Sl (that is to say in fact to the output SAb to which a 1H delay is applied) while another gate of the same kind, G11, has its two inputs connected to the two outputs Sbl and Sbc of the recognition channel REb. The outputs of these gates are connected to the two inputs of OR gate G12 or of the NOR type, of which the output is connected to COM input of multiplexer MX.

As regards detecting circuit ERh, it is not essential for the logic conditions SHl·Shc to be set specifically since, if such a condition is applied in the identifying channel REh associated with the higher threshold, the processing and identifying unit will interpret it as an unidentifiable character. It is in addition the function of the driving means F to simulate such a condition whenever an error of another kind occurs. Thus, it would be possible, as in the case of channel REb, to detect the condition $\overline{Shl} \cdot SAh$ of the second kind illustrated by FIG. 10 which persists in recognition channel REh. Another kind of error, which it is particularly useful to take into account when it occurs in recognition channel REh, is that represented by the situation where neither of flip-flops JKh1 and JKhc has a changed state at the end of the signal generated by the circuit SEbh, that is to say at the moment when a pulse appears at output ECH, which would normally signify that a very long interval is read, but during this time a signal is in fact present at output SAb or at output s1 of shift register RDAb, which can be nothing else but an error. Under these conditions, so that the processing and identifying unit will not interrupt the signals which are transmitted to it as an "end of character" whereas what is in fact concerned is a reading error, circuit ERh is designed to detect the condition:

$$\overline{Shl} \cdot \overline{Shc} \cdot Sab$$

The signal present at output SAb is used in preference to the corresponding signal present at output SAh so as to allow errors to be detected with greater sensitivity.

Figure 12:
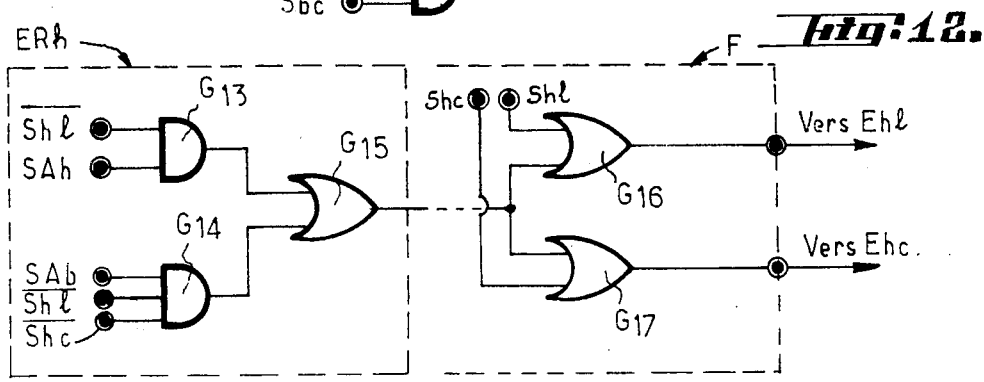
FIG. 12 shows an embodiment of the circuits ERh and F of FIG. 3.

To sum up what has just been explained with regard to the detection of errors on recognition channel REh, reference may be made to FIG. 12 which shows a possible embodiment for the error detecting circuit ERh associated with the driving means F. AND gate (or a NAND gate) G13 performs exactly the same detecting function as gate G10 in FIG. 11. AND (or NAND) gate G14, for its part, has three inputs of which two are connected to the outputs ($\overline{Shl}$ and $\overline{Shc}$) complementary to the outputs of recognition channel REh and of which the third input is connected to output SAb of the circuit SEAb which thus receives the signals from sensor A. The outputs of gates G13 and G14 are connected to respective ones of the two inputs of an OR (or NOR) gate G15 and the output of this gate in fact forms the signal output of circuit ERh. For its part, the driving circuit F is formed by two—input OR gates (or NOR gates) G16 and G17 of which two respective inputs are connected to the output of circuit ERh and which the other two inputs are respectively connected to the signal outputs of recognition channel REh. The outputs of gates G16 and G17 are respectively connected to inputs Ehl and Ehc of multiplexer MX. If reference is made to FIG. 3, it can thus be seen that the embodiment of the driving circuit F shown in FIG. 12 is in fact intended for connection between the outputs of recognition channel REh and the inputs Ehc Ehl of multiplexer MX. Thus as mentioned above, in the case of an uncorrectable error being detected in channel REh, the drive circuit F, actuated by circuit ERh, will act on multiplexer MX to cause signals to be transmitted simultaneously to both outputs SL and SC, which will be interpreted as an error by the processing and recognition unit.

The invention is not of course in any way restricted to the embodiments described and illustrated, which are given merely by way of example. In particular, it covers all means which form technical equivalents of the means described, as well as combinations of these if such combinations are made in accordance with the spirit of the invention and are employed in the context of the following claims.

I claim:

1. A system for reading coded characters formed on a document by a succession of groups of segments of constant width, which are aligned along a reading path and which, to define a given character, are separated from one another by intervals whose length are selected from a set of n predetermined lengths and which can be recognizable electronically by the detection of a physical, and in particular magnetic, phenomenon by a suitable type of sensor, of the kind comprising at least one reading head incorporating at least one such sensor arranged facing the said reading path for reading the characters upon relative movement of the document with respect to the reading head which has at least one analog signal output representing the said intervals read by the said sensor, comprising an output for signal pulses for each predetermined length, an analog/digital converter circuit connected to receive the said analog signal output, and a logic circuit for recognizing the said intervals and being connected between the output of said converter circuit and the said output for said signal pulses, said converter circuit comprising m threshold switching circuits having thresholds of different respective values, and said logic circuit for recognizing the said intervals:

having m separate recognition channels, m being a whole number greater than 1, each connected to the output of one of the said threshold switching circuits and each having a group of n outputs corresponding to the said n interval of length, and m positions selecting circuit having n outputs connected to respective ones of the pulse signal outputs for each said predetermined length, and m groups of n inputs each connected to a respective group of n outputs of the m recognition channels and also comprising control means for enabling the n inputs of one of the m groups to be brought selectively into correspondence with the n outputs of the said selecting circuits in a predetermined order progressing from the group connected to the recognition channel associated with the lowest threshold to the group connected to the recognition channel associated with the highest threshold, the groups being arranged in ascending order of the said thresholds, and means for detecting identification errors which are operatively coupled to the said control means to actuate the latter to produce and continue with the said predetermined order of succession for as long as an error is detected in the signals transmitted by a recognition channel whose outputs are currently coupled to the outputs of the said selecting circuits.

2. A reading system according to claim 1, characterized in that $n=2$ and $m=2$.

3. A reading system according to claim 2, in which the reading head contains two sensors having a center-to-center distance e which meets the dual conditions of inequality:

$$b-1<e<a+1$$

where a and b respectively represent a short interval and a long interval and 1 represents the width of one of the segments, a first sensor being arranged to detect the presence of the said segments before the second sensor during relative movement between the said reading head and the said document, each sensor being connected to a separate analog signal output, each said recognition channel having a first monostable means sensitive to a rising edge, said means being connected to a first threshold switching circuit associated with the said first sensor and being adapted to be actuated by each rising edge of the signal coming from the said threshold switching circuit, a first logic circuit having one input connected to the said first monostable means and another input connected to a threshold switching circuit associated with the said second sensor, said first logic circuit being adapted to emit a significant output signal when a signal from the said first monostable means arrives during the period of a pulse generated by the said threshold switching circuit associated with the said second sensor, and a first memory means having one input connected to the output of the said first logic circuit, a second monostable means sensitive to a falling edge, said second monostable means being connected to the same threshold switching circuit associated with the said first sensor and being adapted to be actuated by each falling edge of the signal generated by the said threshold switching circuit, a second logic circuit having one input connected to the said second monostable means and another input connected to the said threshold switching circuit associated with the said second sensor, said second logic circuit being adapted to emit a significant output signal when a signal coming from a said second monostable means arrives during the period of a pulse generated by the said threshold switching circuit associated with the said second sensor, and a second memory means having one input connected to the output of the said second logic circuit.

4. A system according to claim 3, wherein the said first and second monostable comprise a shift register of which one signal input is connected to the said threshold switching circuit associated with the said first sensor, and which has first and second outputs, the said first output being directly connected to one input of a first gate, the said second output being connected to another input of the said first gate via a NOT gate, and the said first output also being connected to one input of a second gate via a NOT gate, and the said second output being directly connected to one input of the said second gate.

5. A system according to claim 4, wherein the said first and second circuits are combined with the said first and second monostable means and the said first and second gates each have three inputs of which one is connected to the said threshold switching circuit associated with the second sensor.

6. A system according to any of claims 2, 3, 4 or 5, wherein the said selecting circuit comprises a multiplexer having two groups of two inputs, two outputs, and one switching input, the said multiplexer being arranged such that the two inputs in the group connected to the recognition channel associated with the lowest threshold correspond with the said two outputs when the said switching input does not receive a signal and the two inputs in the group connected to the recognition channel associated with the high threshold correspond to the said two outputs when the said switching input does receive the signal, and said means for detecting identification errors comprises a circuit for detecting errors on the said recognition channel associated with the lowest threshold of which one signal output is connected to the said switchng input.

7. A system according to claim 6, wherein the said circuit for detecting errors on the recognition channel associated with the lowest threshold comprises at least one gate having two inputs connected to respective ones of the two outputs of the recognition channel associated with the low threshold.

8. A system according to claim 6, wherein the said circuit for detecting errors on the recognition channel associated with the lowest threshold comprises at least one gate having one input connected to a complemented output corresponding to the long interval of the recognition channel associated with the low threshold and another input connected to the low threshold switching circuit associated with the said first sensor.

9. A system according to claim 6, further including drive means, the group of inputs of the said multiplexer which is connected to the recognition channel associated with the high threshold being connected to the said channel via said drive means, said drive means having one overriding driving input connected to the output of a circuit for detecting errors on the said recognition channel associated with the high threshold.

10. A system according to claim 9, wherein the said circuit for detecting errors on the recognition channel associated with the high threshold comprises at least one gate having one input connected to a complemented output corresponding to the long interval of the recognition channel associated with the high threshold and another input connected to the high threshold switching circuit associated with the said first sensor.

11. A system according to claim 9, wherein the said circuit for detecting errors on the recognition channel associated with the high threshold comprises at least one gate having two inputs connected to respective ones of two complemented outputs corresponding to the long and short intervals of the recognition channels associated with the high threshold and of a third input connected to the one of the threshold switching circuits associated with the said first sensor.

* * * * *

UNITED STATES PATENT AND TRADEMARK OFFICE
CERTIFICATE OF CORRECTION

PATENT NO. : 4,246,473

DATED : January 20, 1981

INVENTOR(S) : MAUSSION, Daniel

It is certified that error appears in the above-identified patent and that said Letters Patent are hereby corrected as shown below:

(73) "Compagnie Internationale pour l'Informatique" should be -- Compagnie Internationale pour l'Informatique CII-Honeywell Bull (Societe Anonyme) --.

Signed and Sealed this

Fourteenth Day of April 1981

[SEAL]

Attest:

RENE D. TEGTMEYER

Attesting Officer        Acting Commissioner of Patents and Trademarks